United States Patent [19]
Feldman et al.

[11] Patent Number: 6,078,398
[45] Date of Patent: Jun. 20, 2000

[54] PATTERN ANALYZER

[75] Inventors: Sandra Freedman Feldman, Niskayuna; Harsha Mysore Hatti, Schenectady, both of N.Y.

[73] Assignee: General Electric Company, Schenectady, N.Y.

[21] Appl. No.: 09/188,094

[22] Filed: Nov. 9, 1998

[51] Int. Cl.⁷ .................................. G01J 3/50; G01J 3/46
[52] U.S. Cl. .......................... 356/402; 250/226; 356/416; 356/425
[58] Field of Search ...................................... 356/402, 405, 356/406, 407, 416, 425, 418, 419; 250/226

[56] References Cited

U.S. PATENT DOCUMENTS

| | | | |
|---|---|---|---|
| 3,789,983 | 2/1974 | Senesky | 356/419 |
| 4,061,428 | 12/1977 | Amano et al. | 356/404 |
| 4,474,470 | 10/1984 | Brabdt et al. | 356/408 |
| 4,652,126 | 3/1987 | Mahooti | 356/244 |
| 4,881,268 | 11/1989 | Uchida et al. | 382/7 |
| 5,120,126 | 6/1992 | Wertz et al. | 356/71 |
| 5,559,173 | 9/1996 | Campo et al. . | |
| 5,590,251 | 12/1996 | Takagi . | |
| 5,642,192 | 6/1997 | Gordon et al. . | |
| 5,650,942 | 7/1997 | Granger . | |
| 5,831,740 | 11/1998 | Terauchi | 356/402 |

FOREIGN PATENT DOCUMENTS 1013423  12/1965  United Kingdom ................... 356/405

OTHER PUBLICATIONS

U.S. Patent Application, Ser. No. 08/926,084; filed Sep. 2, 1997, (RD–24814).

U.S. Patent Application, Ser. No. 09/075,913; filed May 11, 1998, (RD–25074).

*Primary Examiner*—Frank G. Font
*Assistant Examiner*—Layla Lauchman
*Attorney, Agent, or Firm*—Marvin Snyder; Douglas E. Stoner

[57] ABSTRACT

A patterned sample is analyzed by traversing a light spot across the sample and analyzing detected color at several sites to spatially resolve the pattern. A pattern analyzer includes a holder for supporting the sample which is illuminated by projecting the light spot onto the sample. A color sensor receives light reflected by the sample at the light spot and analyzes color of the sample at the spot. The spot is traversed across the sample surface to obtain a plurality of color readings across the surface to spatially resolve the pattern.

11 Claims, 2 Drawing Sheets

PATTERN ANALYZER

BACKGROUND OF THE INVENTION

This invention relates generally to measurement devices, and, more specifically, to optical spectrometers.

Various commercial products are manufactured from plastic. In one example, plastic is used for countertops which are offered in various solid colors or patterns. Enduran (trademark) plastic is commercially available from the General Electric Company in various color patterns commonly having natural stone appearance features. For example, this plastic may have varying color for emulating natural stones such as granite or marble.

This reproduction stone appearance is relatively complex since both color and pattern vary along the surface of the countertop to emulate the stone. During manufacture of the countertop, suitable quality control is required to ensure that the countertop is a visually acceptable reproduction of the intended stone appearance. This quality control is currently conducted by visual examination of the plastic countertop sheet material, which examination is correspondingly subjective.

Accordingly, it is desired to provide a pattern analyzer for colored sheet plastic to provide a quantitative representation of the visual appearance of the sheet for a comparison with a corresponding acceptable standard.

BRIEF SUMMARY OF THE INVENTION

A patterned sample is analyzed by traversing a light spot across the sample and analyzing detected color at several sites to spatially resolve the pattern. A pattern analyzer includes a holder for supporting the sample which is illuminated by projecting the light spot thereon. A color sensor is optically aligned with the holder for analyzing color of the sample at the spot. The spot is traversed across the sample to obtain a plurality of color readings across the sample to spatially resolve the pattern.

DETAILED DESCRIPTION OF THE INVENTION

Figure 1:
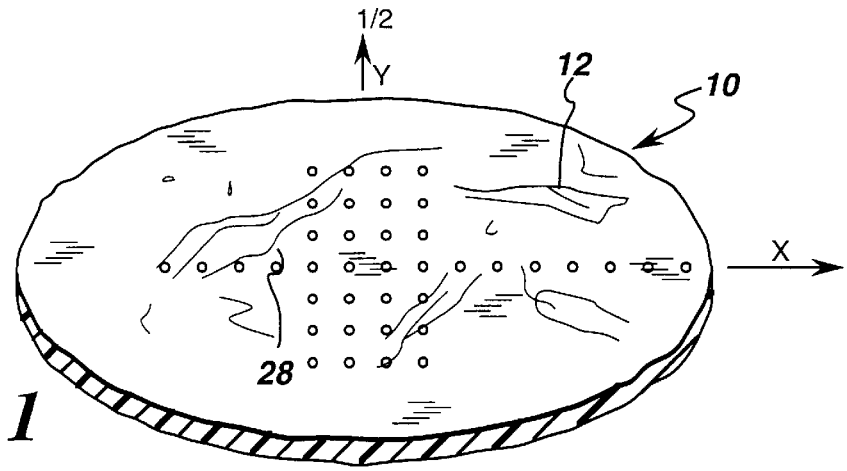
FIG. 1 is a top isometric view of a sample having a visual pattern thereon for being spatially resolved.

FIG. 1 illustrates a portion of a plastic sheet or laminate defining a sample 10 which includes an integral pattern 12 of any desired configuration. The pattern varies in color intensity and/or shades to produce a desirable appearance such as that of natural stones, for example, granite or marble. The pattern may therefore vary randomly in its features in order to reproduce the general appearance of relatively complex natural stones, or other patterns as desired. In one example, sample 10 is a portion of a plastic sheet or laminate commercially available from General Electric Company under the trademark Enduran.

During the plastic sheet manufacturing process, the pattern 12 that is produced must be evaluated or analyzed to determine its similarity to the desired pattern, such as natural stones. This is readily accomplished by use of a pattern or quality analyzer 14, as shown schematically in FIG. 2.

The pattern analyzer 14 is a system comprised of components including a holder 16 in any suitable form, such as a plate having a window or aperture 18 therethrough upon which sample 10 may be mounted for analysis. The sample may be a portion of a manufactured plastic sheet for which analysis is desired.

Disposed adjacent aperture 18 is an illuminator 20 for projecting a light spot 22 on the sample preferably perpendicular thereto. A color sensor 24 is adapted to analyze color of the sample at the spot, preferably obliquely thereto. Other orientations of the illuminator 20 and the sensor 24 may alternatively be used.

Support means in the exemplary form of a multiaxis carriage or stage 26 are provided for supporting holder 16 for selective movement along multiple axes to traverse the light spot across the sample, preferably by traversing the sample relative to the spot. In this manner, a plurality of color readings across the sample can be obtained to spatially resolve the surface pattern of the sample. Specifically, the sample may be analyzed by spatially resolving the pattern obtained by traversing light spot 22 across a plurality of discrete sites 28, as shown in FIG. 1, and in enlarged view in FIG. 3. The color of the sample at the several sites 28 is then analyzed by color sensor 24 to spatially resolve the pattern with quantitative data.

Figure 2:
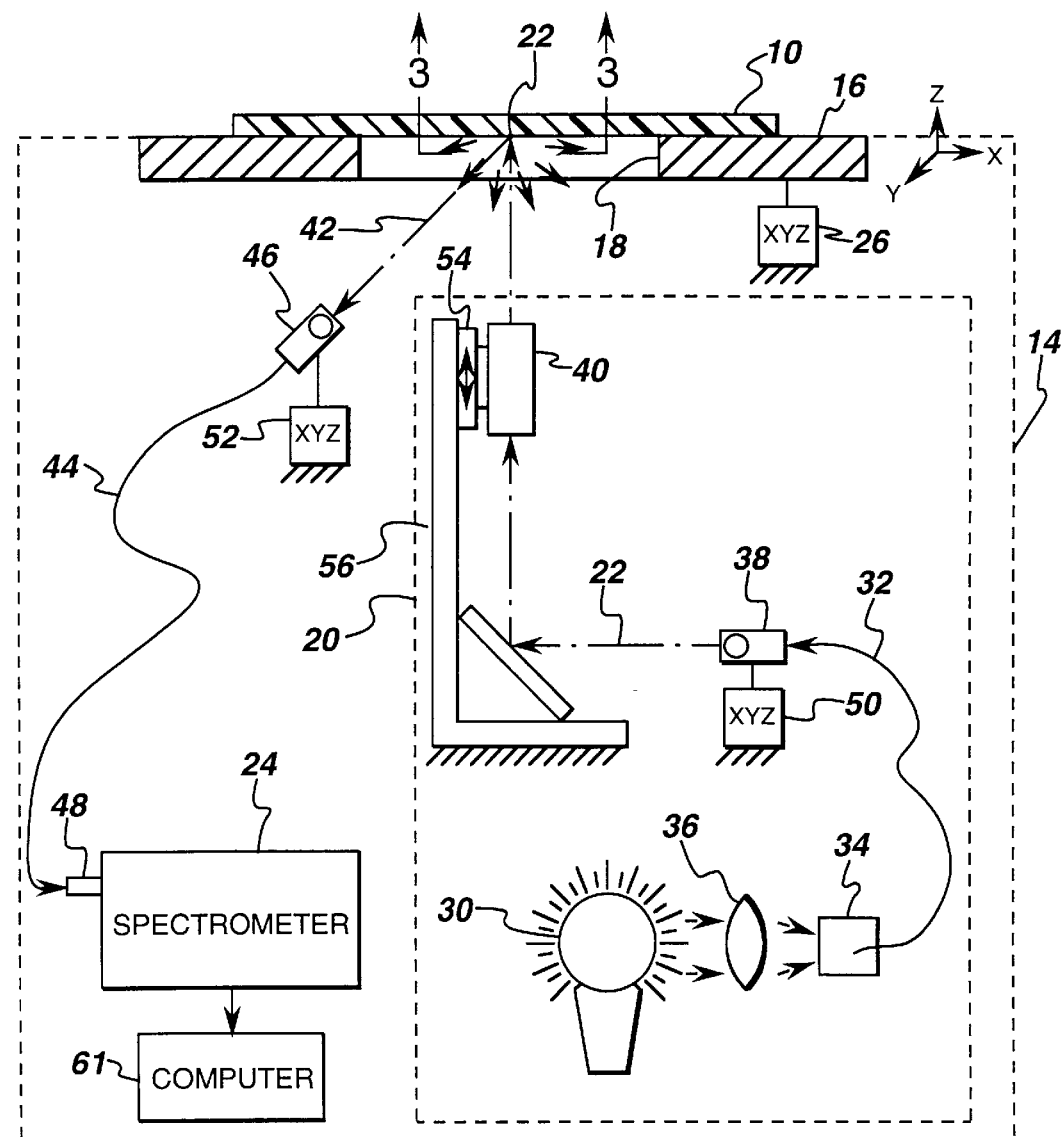
FIG. 2 is a schematic representation of a pattern analyzer for analyzing the pattern of the sample illustrated in FIG. 1.

As shown in FIG. 2, illuminator 20 is comprised of components including a suitable light source or lamp 30 and a cooperating optical fiber 32 which channels light from lamp 30 to define the spot on the sample. Fiber 32 includes an input end 34 optically aligned with lamp 30 through an optical focusing lens 36 for example, and also includes an output end 38 containing an integral ball lens for projecting the light spot onto the sample. Lamp 30 may comprise any conventional light source, such as a tungsten-halogen lamp with an optical wavelength of about 400–770 nm in the visible light spectrum.

Illuminator 20 further includes a microscope objective 40 optically aligned between fiber 32 output end 38 and aperture 18 of holder 16 for narrowing the light spot on sample 10 to increase spatial resolution thereof. The light projected from fiber output end 38 has a minimum diameter of about 2 mm, with objective 40 being configured for further narrowing light spot 22 on the sample down to about 0.25 mm for example. Objective 40 may take any conventional form and typically includes a series of lenses with magnification designations including, for example, 5× or 10×, but used in the analyzer for narrowing the light ray from fiber 32 instead of magnifying the light ray. In this way, substantially increased spatial resolution of pattern 12 on the sample may be obtained and analyzed by sensor 24.

Color sensor 24, as illustrated in FIG. 2, is in the exemplary form of a spectrometer and may take any other conventional form for analyzing the light 42 diffused and reflected by the sample at the spot 22. The color sensor also includes an input optical fiber 44 having an input end 46, also including a ball lens therein, optically aligned with the aperture 18 of the holder for receiving the reflected light 42 diffused from spot 22 on the sample. The fiber input end 46 is typically mounted obliquely to the sample and objective 40, at about 45° therefrom, for example. Optical fiber 44 also includes an output end 48 suitably coupled to the spectrometer for channeling the reflected light thereto. This light is then analyzed in the spectrometer and displayed or provided in any conventional format for use in analyzing pattern 12 (FIG. 1).

Spectrometer 24, illumination fiber 32, collection fiber 44, and associated fittings are all commercially available from Ocean Optics, Inc., of Dunedin, Fla. Other conventional equipment may alternatively be used.

In the preferred embodiment illustrated in FIG. 2, the main stage 26 supporting the holder and sample has three axes of translation movement or adjustment X,Y,Z, and two axes of rotation adjustment to level the sample. Similarly, output end 38 of illumination fiber 32 is supported by a similar multiaxis stage 50 which also provides three axes of adjustment X,Y,Z. Input end 46 of spectrometer fiber 44 also includes a corresponding multiaxis stage 52 for providing three axes of adjustment in X,Y,Z directions.

Microscope objective 40 is preferably mounted on its own carriage or stage 54 to a suitable stationary frame 56 and is adjustable in the Z direction. Objective 40 is preferably mounted directly below holder 16 for maintaining a constant offset distance from the bottom of sample 10 resting atop holder 16. In this way, the thickness of the sample does not affect the distance between the analyzed down-facing surface of the sample which is maintained at a constant vertical distance above objective 40 once positional adjustments have been made.

The vertical spacing between the sample and objective 40 may be adjusted using either stage 26 or stage 54. Alignment of the outbound illumination light and light reflected off the sample for recovery by inbound optical fiber 44 may be adjusted using stages 50, 52. The analyzer may be made more compact by using an optional folding mirror 58 attached to frame 56 below objective 40 and optically aligned with the illumination fiber output end 38.

In operation, the light generated by lamp 30 is channeled through illumination fiber 32 through the microscope objective 40 to produce a narrow light spot 22 at a corresponding analysis site 28 (FIG. 3) on the sample. The diffusely reflected light 42 is collected by input fiber 44 and delivered to spectrometer 24 wherein it is analyzed in any conventional format such as the L,a,b format indicative of intensity, red-green shift, and yellow-blue shift, respectively. Corresponding L,a,b data are then obtained in turn at each of the several analysis sites 28 shown generally in FIGS. 1 and 3 for obtaining spatial data for sample pattern 12.

The spatial data may be obtained by operating holder stage 26 to produce a suitable line or grid pattern of sites 28 over a finite area of the sample for analyzing the pattern thereon. Sample 10 is preferably traversed linearly along the X axis, for example, to produce a suitable number of corresponding analysis sites 28. The sample may then be rastered to produce several such lines of analysis sites 28 and corresponding L,a,b data therefrom. Since exemplary pattern 12, illustrated in FIG. 3, may vary randomly in any direction, the spatial resolution of the pattern may be conducted in any of those directions including the X-axis, Y-axis, or any angular inclination therebetween. By obtaining a two dimensional grid of analysis sites 28, pattern 12 may be analyzed along two or more intersecting directions to cover a suitable analysis area.

Figure 3:
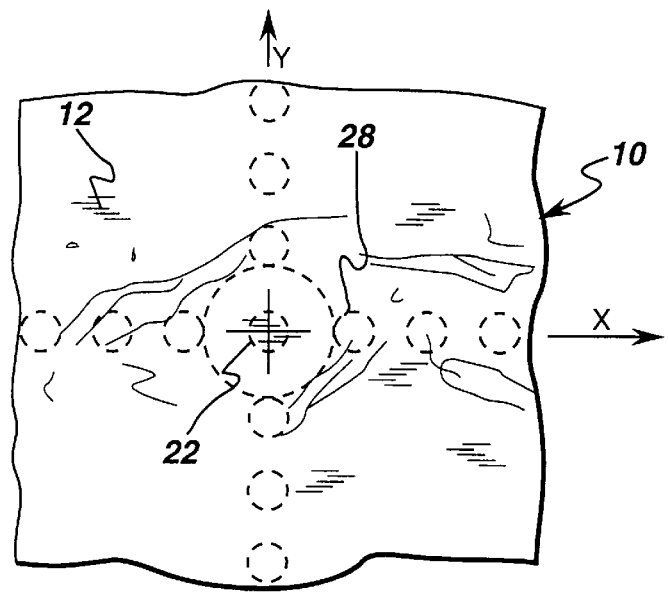
FIG. 3 is a plan view of a portion of the sample illustrated in FIG. 2 and taken along line 3—3 of FIG. 2 to show an illuminating spot traversed across this portion of the sample.
Figure 4:
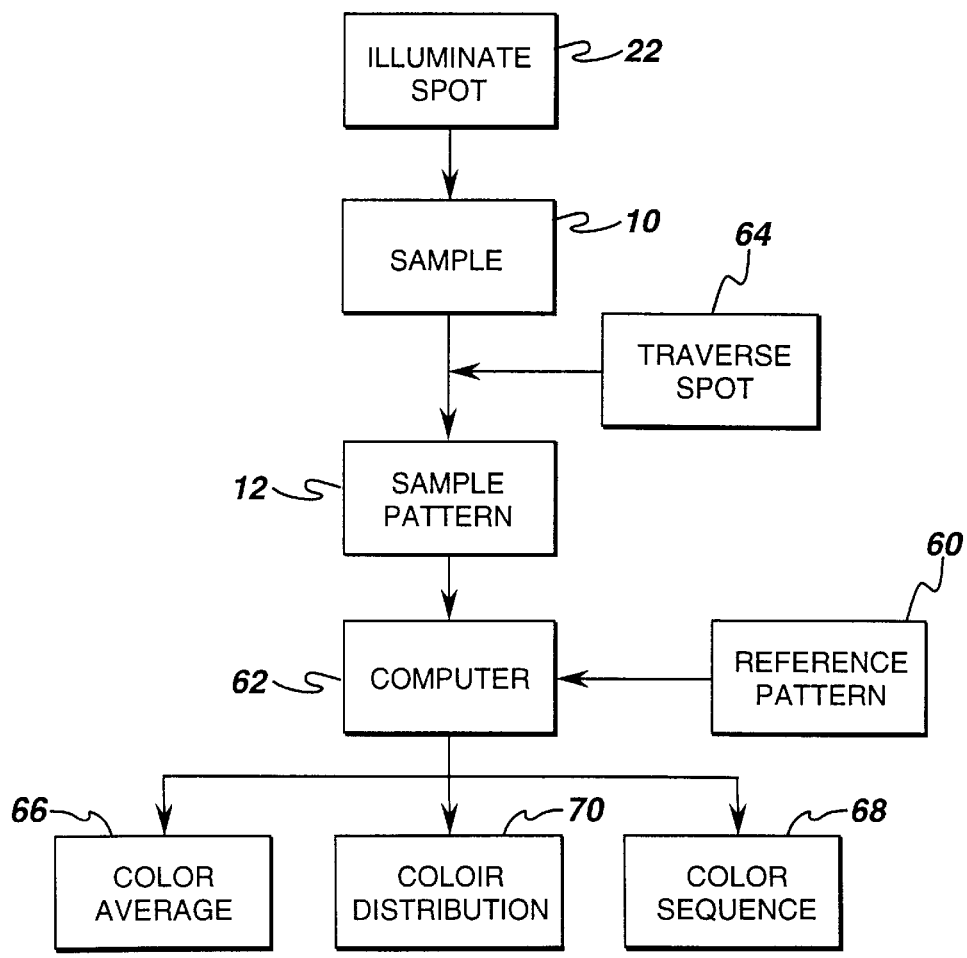
FIG. 4 is a flowchart representation of a method of analyzing the sample pattern illustrated in FIGS. 1 and 3.

FIG. 4 illustrates schematically an automated process for analyzing sample pattern 12 illustrated in FIG. 3 in accordance with an exemplary embodiment of the invention. At step 64, main stage 26 may be operated to traverse light spot 22 across sample 10 for obtaining a suitable number of discrete analysis sites at which corresponding L,a,b data are obtained and suitably stored. Alternatively, holder 16 may be held fixed and analyzer 14 operated to traverse light spot 22 across the sample to obtain the discrete analysis sites. In either instance, the L,a,b data for the several analysis sites are indicative of pattern 12 in the area traversed. At step 62, these data may then be compared to a predetermined reference pattern 60 constituting an acceptable pattern for the sample. Reference pattern 60 may be configured in any suitable manner to represent one or more rows of acceptable pattern definition corresponding with one or more rows of analysis sites 28. Reference pattern 60 may be stored in a suitable computer memory, and the comparison may be effected in a suitably programmed digital computer 61 (FIG. 2) responsive to the data provided by spectrometer 24.

In a simple embodiment, reference pattern 60 may comprise a series of data references, in L,a,b format for example, corresponding with one or more pattern lines. Corresponding analyzed data for sample 10 may then be compared with reference pattern 60 to determine whether or not suitable matches exist therebetween. Since pattern 12 is represented by variations in color in sample 10, comparing colors analyzed at the several sites 28 with reference pattern 60 is useful for determining any color matching therebetween.

Reference pattern 60 may be initially obtained by using pattern analyzer 14 on a reference sample known in advance to have acceptable appearance. If a subsequent sample 10 being analyzed were in fact identical to the reference sample, then it is possible to effect an exact match between the analyzed data for the sample and corresponding data indicative of the reference pattern 60. In practice, however, the random nature of pattern 12 requires further analysis for quantitatively determining its acceptability.

For example, one level of comparison between sample 10 and reference pattern 60 evaluates color distribution therebetween. Color distribution may be obtained by using a conventional histogram which plots the number of occurrences of a specific color as a function of the specific colors being investigated. A sample in the form of a reproduction of marble stone, for example, would typically have a substantially constant background color superimposed with one or more additional feature colors to define the marble pattern. Each data point obtained may be assigned a single color value. Accordingly, a finite number of colors may be used to represent the background and feature colors, and such colors should appear with a substantially higher frequency for the background color as opposed to the different feature colors. Some feature colors may be represented by relatively small features or flecks in the sample, requiring the narrow resolution provided by microscope objective 40 with a corresponding frequency of appearance.

The collectively analyzed sites 28 may then be represented in a histogram with bins corresponding with a range of colors obtained from the sample and compared with a corresponding histogram of reference pattern 60 for comparing color distribution within preestablished tolerances therebetween. The color distribution 70 represented by the histogram is independent of sequence and is a general indication of color distribution matching.

An additional level of comparison may be obtained at step 62 by comparing the average color 66 between the sample and reference pattern 60 within suitable statistical standard deviations. This may be simply effected in computer 61 by comparing average bin color in the sample histogram with the average bin color for the reference histogram. An acceptable sample 10 should have an average color in a given region corresponding with an average color in reference pattern 60.

Yet another level of comparison may be effected at step 62 in the color sequence 68 between the sample and reference patterns. By also comparing the sequence of color along various lines of the analyzed sites 28 with corresponding acceptable color sequences of reference pattern 60, a more precise comparison may be made between the sample pattern and reference pattern.

The pattern analyzer illustrated in FIG. 2 constitutes an effective tool for analyzing color over a locus of data sites 28 on sample 10 with significant precision due to microscope objective 40 for spatially resolving the visual pattern and any defects or flaws therein in the exemplary range of 0.25–10 mm. Comparison of color data for the several sites with reference pattern 60 can now be used for matching average color, color distribution, and color sequence, either singly or in combination, to provide various levels of matching between the sample and an approved reference pattern. These data are quantitative and obviate need for relying on subjective interpretation by mere visual observation.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. A pattern analyzer for a sample having a pattern of varying color and intensity comprising:

an illuminator for projecting a light spot on said sample;

a color sensor for analyzing color of said sample at said spot;

means for traversing said spot across said sample for obtaining a plurality of color readings thereacross to spatially resolve said pattern; and a computer for comparing the spatially resolved pattern with a reference pattern to determine how closely said spatially resolved pattern matches said reference pattern in general appearance.

2. An analyzer according to claim 1 wherein said traversing means comprise:

a holder for supporting said sample; and a stage for supporting said holder, said stage being capable of allowing selective movement along multiple axes to traverse said sample relative to said spot.

3. An analyzer according to claim 2 wherein said illuminator comprises:

a light source; and an optical fiber having an input end optically aligned with said light source, and an output end for projecting said light spot onto said sample.

4. An analyzer according to claim 3 wherein said illuminator further comprises a microscope objective optically aligned between said optical fiber output end and said holder for narrowing said light spot on said sample to increase spatial resolution thereof.

5. An analyzer according to claim 3 wherein said color sensor comprises a spectrometer having an input optical fiber for receiving light diffused from said spot on said sample and configured to analyze said diffused light for color thereof.

6. An analyzer according to claim 1 including a holder for supporting said sample, wherein said holder and said illuminator are adapted to move relative to each other.

7. A method of analyzing a sample having a pattern thereon of varying color and intensity, comprising the steps of:

traversing a light spot across a plurality of sites along said sample;

analyzing color of said sample at said sites to spatially resolve said pattern; and comparing the spatially resolved pattern with a reference pattern to determine how closely said spatially resolved pattern matches said reference pattern in general appearance.

8. A method according to claim 7 wherein the comparing step comprises:

comparing colors analyzed at said sites with said reference pattern for determining any color matching therebetween.

9. A method according to claim 8 wherein the step of comparing colors comprises comparing average color between said sample and reference patterns.

10. A method according to claim 8 where the step of comparing colors comprises comparing color distribution between said sample and reference patterns.

11. A method according to claim 8 wherein the step of comparing colors comprises comparing color sequence between said sample and reference patterns.

\* \* \* \* \*